US011885103B2

(12) United States Patent
Uebel et al.

(10) Patent No.: US 11,885,103 B2
(45) Date of Patent: Jan. 30, 2024

(54) POWER SYSTEM FOR A WORKING MACHINE AND CORRESPONDING OPERATION METHOD

(71) Applicant: Volvo Construction Equipment AB, Eskilstuna (SE)

(72) Inventors: Karl Uebel, Kvicksund (SE); Per Mattsson, Sölvesborg (SE); Daniel Stålberg, Eskilstuna (SE)

(73) Assignee: VOLVO CONSTRUCTION EQUIPMENT AB, Eskilstuna (SE)

( * ) Notice: Subject to any disclaimer, the term of this patent is extended or adjusted under 35 U.S.C. 154(b) by 0 days.

(21) Appl. No.: 17/923,368

(22) PCT Filed: May 4, 2020

(86) PCT No.: PCT/EP2020/062286
§ 371 (c)(1),
(2) Date: Nov. 4, 2022

(87) PCT Pub. No.: WO2021/223837
PCT Pub. Date: Nov. 11, 2021

(65) Prior Publication Data
US 2023/0135081 A1 May 4, 2023

(51) Int. Cl.
*E02F 9/20* (2006.01)
*E02F 9/22* (2006.01)

(52) U.S. Cl.
CPC ............ *E02F 9/2075* (2013.01); *E02F 9/202* (2013.01); *E02F 9/2091* (2013.01); *E02F 9/2217* (2013.01); *E02F 9/2292* (2013.01)

(58) Field of Classification Search
CPC ....... E02F 9/2075; E02F 9/202; E02F 9/2091; E02F 9/2217; E02F 9/2292; E02F 9/2079; Y02T 10/62
See application file for complete search history.

(56) References Cited

U.S. PATENT DOCUMENTS 7,195,580 B2 * 3/2007 Funato ................. F16H 61/468
477/110
7,220,203 B2 * 5/2007 Holmes ................. B60K 6/445
475/5

(Continued)

FOREIGN PATENT DOCUMENTS

JP 2009241829 A 10/2009

OTHER PUBLICATIONS

International Search Report and Written Opinion of the International Searching Authority, PCT/EP2020/062286, dated Feb. 9, 2021, 12 pages.

*Primary Examiner* — Drew J Brown
(74) *Attorney, Agent, or Firm* — Sage Patent Group (57) ABSTRACT

A power system for a working machine, including a prime mover drivingly connectable to a main shaft; a planetary gear set including a rotatable first member drivingly connected to the main shaft, a rotatable second member and a rotatable third member for propulsion of the working machine; a hydraulic system including at least one hydraulic actuator for performing a working function of the working machine; an electric energy storage system; a first hydraulic machine mechanically coupled to the main shaft and hydraulically coupled to the hydraulic system; a first electric machine mechanically coupled to the main shaft; a second electric machine mechanically coupled to the rotatable second member, wherein the electric energy storage system is electrically connected to the first and second electric machines, and wherein the power system further includes a second hydraulic machine mechanically coupled to the rotatable second member and hydraulically coupled to the hydraulic system.

24 Claims, 3 Drawing Sheets

(56) References Cited

U.S. PATENT DOCUMENTS

| | | | | |
|---|---|---|---|---|
| 7,972,236 | B2* | 7/2011 | Hiraki | B60L 1/003 |
| | | | | 475/5 |
| 9,382,983 | B2* | 7/2016 | Tang | F16H 61/66 |
| 10,215,199 | B2* | 2/2019 | Cosoli | F15B 1/04 |
| 10,215,276 | B2* | 2/2019 | Serrao | F16H 61/452 |
| 10,350,995 | B2* | 7/2019 | Edward | F16H 61/444 |
| 10,514,084 | B2* | 12/2019 | Watt | F16H 37/084 |
| 2006/0229153 | A1* | 10/2006 | Bucknor | B60K 6/365 |
| | | | | 475/5 |
| 2008/0081734 | A1* | 4/2008 | Duffy | B60W 20/10 |
| | | | | 477/107 |
| 2010/0298081 | A1* | 11/2010 | Ivanysynova | B60K 6/12 |
| | | | | 475/72 |
| 2013/0123055 | A1* | 5/2013 | Mattsson | E02F 9/202 |
| | | | | 475/149 |
| 2016/0115672 | A1 | 4/2016 | Heybroek et al. | |

* cited by examiner

Fig. 3 ns filed on May 4, 2020, the disclosure and content of which is incorporated by reference herein in its entirety.

POWER SYSTEM FOR A WORKING MACHINE AND CORRESPONDING OPERATION METHOD

CROSS REFERENCE TO RELATED APPLICATIONS

This application is a 35 U.S.C. § 371 national stage application of PCT International Application No. PCT/EP2020/062286 filed on May 4, 2020, the disclosure and content of which is incorporated by reference herein in its entirety.

TECHNICAL FIELD

The invention relates to a power system for a working machine, to a method for operating a power system for a working machine, to a control unit and/or to a working machine.

The invention is applicable on working machines within the fields of industrial construction machines or construction equipment, such as wheel loaders. Although the invention will be described with respect to a wheel loader, the invention is not restricted to this particular machine, but may also be used in other working machines such as articulated haulers, excavators and backhoe loaders.

BACKGROUND

Working machines, such as wheel loaders, are undergoing a rapid development towards more electrification. For example, the working machines may be electric hybrid machines, such as "plug-in" electric hybrid machines, where the working machine is operated by use of an internal combustion engine and by use of one or more electric machines in combination with an electric energy storage system which can be charged by plugging in to the grid.

A working machine generally comprises a driveline for propulsion of the working machine and one or more working functions. The working functions may be any one of a wheel loader function, a reach stacker function, a telehandler function, a forestry machine function, a forklift function for a forklift truck, or any other working function requiring a hydraulic system.

In view of the above, there is a strive towards developing more cost-efficient and energy efficient working machines which are powered by an engine and by one or more additional power suppliers in the form of electric machines.

SUMMARY

An object of the invention is to provide an improved power system for a working machine which is cost and energy efficient, or which at least provides a suitable alternative to known power systems for working machines. Another object of the present invention is to provide an improved method for operating a power system for a working machine which is cost and energy efficient. A yet further object of the invention is to provide a working machine comprising an improved power system which is cost and energy efficient, or which at least provides a suitable alternative to known working machines.

According to a first aspect of the invention, the object is achieved by a power system according to claim 1. According to a second aspect of the invention, the object is achieved by a method according to claim 16. According to a third aspect of the invention, the object is achieved by a control unit according to claim 23. According to a fourth aspect of the invention, the object is achieved by a working machine according to claim 24.

According to the first aspect, the object is achieved by a power system for a working machine, comprising:

a prime mover and a main shaft, wherein the prime mover is drivingly connectable to the main shaft;
a planetary gear set comprising a rotatable first member drivingly connected to the main shaft, a rotatable second member and a rotatable third member for propulsion of the working machine;
a hydraulic system comprising at least one hydraulic actuator for performing a working function of the working machine during use of the working machine;
an electric energy storage system;
a first hydraulic machine mechanically coupled to the main shaft and hydraulically coupled to the hydraulic system;
a first electric machine mechanically coupled to the main shaft;
a second electric machine mechanically coupled to the rotatable second member, wherein the first and second electric machines are electrically connected and wherein the electric energy storage system is electrically connected to the first and second electric machines, and wherein the power system further comprises:
a second hydraulic machine mechanically coupled to the rotatable second member and hydraulically coupled to the hydraulic system.

By the provision of the power system as disclosed herein, a high-efficient and low-cost power system for a working machine is achieved. More specifically, by the configuration of the power system—and in particular by how the electric machines and the hydraulic machines are connected to the planetary gear set and to the main shaft—it is possible to provide sufficient performance with lower amount of installed power. Furthermore, the power system disclosed herein also allows for fewer and more efficient power transformations.

Optionally, the second hydraulic machine may be configured such that it can be operated in two opposite rotational directions in order to generate hydraulic power to the hydraulic system. This implies improved versatility of the power system, resulting in more efficient power transformations in the power system.

Optionally, at least one of the first and second hydraulic machines may be an electrically controlled hydraulic machine. An electrically controlled hydraulic machine may provide a power system with reduced amount of power losses. This may for example enable to control displacement of the hydraulic machine(s), which may be advantageous if/when providing a hydraulic flow in parallel to an electric flow between the electric machines. An electrically controlled hydraulic machine further implies increased freedom for selecting different control strategies, which in turn may further reduce power losses.

Optionally, the first and second hydraulic machines may be hydraulically coupled so that hydraulic power can be transferred in at least one direction, preferably in any direction, between the first and second hydraulic machine. Thereby further improved efficiency may be provided, enabling more possible control strategies for the power system. Typically, peak efficiencies of hydraulic machines and electric machines are in different operating areas. It can consequently be more efficient to selectively transfer power hydraulically or electrically depending on required torque and speed. The transfer of hydraulic power between the first and second hydraulic machines may for instance be used during lower speeds and high torques when the electric machines have poor efficiency. This may further open up for downsizing of the electric machines, implying a more cost-efficient power system.

Optionally, at least one of the hydraulic machines may be configured to be operated in all possible combinations of positive and negative rotational speeds and positive and negative torque, i.e. a so called four quadrant machine. Thereby yet further improved efficiency may be provided, enabling more possible control strategies for the power system.

Optionally, the rotatable first member may be a sun gear of the planetary gear set. Still optionally, the rotatable second member may be a ring gear of the planetary gear set. Still optionally, the rotatable third member may be a planet carrier of the planetary gear set. It shall however be understood that also other configurations are possible, even though the above mentioned configuration of the planetary gear set has shown to be beneficial for providing a high-efficient and low-cost power system.

Optionally, the power system may further comprise a coupling member between the prime mover and the main shaft for selectively engaging and disengaging the prime mover to the main shaft. This enables pure electric driving with the prime mover disconnected.

Optionally, the power system may further comprise a first gear set, wherein the rotatable third member is drivingly connectable to an output shaft for propulsion of the working machine via the first gear set. By the provision of the first gear set, a fix adjustment of torque and speed to the output shaft is possible. Further, a geometrical drop in height between the main shaft and the output shaft may be provided, which may be beneficial for the installation of the power system in the working machine.

Optionally, the power system may further comprise a first gear set coupling member for selectively engaging and disengaging the rotatable third member with respect to the output shaft.

Optionally, the power system may further comprise a second gear set, wherein the rotatable first member is drivingly connectable to the output shaft via the second gear set.

Optionally, the power system may further comprise a second gear set coupling member for selectively engaging and disengaging the rotatable first member with respect to the output shaft. By the provision of the second gear set and the second gear set coupling member, improved speed range and increased maximum driving speed may be accomplished.

Optionally, the power system may further comprise a reverse gear set, wherein the rotatable third member is drivingly connectable to the output shaft via the reverse gear set for selectively providing a reverse direction of the outgoing speed on the output shaft. Still optionally, the power system may further comprise the output shaft for propulsion of the working machine.

Optionally, the power system may further comprise a first and a second mechanical coupling arrangement, wherein the first hydraulic machine and the first electric machine are directly coupled to the first mechanical coupling arrangement and the second hydraulic machine and the second electric machine are directly coupled to the second mechanical coupling arrangement, and wherein the first mechanical coupling arrangement is directly coupled to the main shaft and the second mechanical coupling arrangement is directly coupled to the rotatable second member. Still optionally, at least one of the first and second coupling arrangements may be configured with a fixed gear ratio. For example, the first mechanical coupling arrangement may comprise two or more mechanically engaging gear wheels and the second mechanical coupling arrangement may also comprise two or more mechanically engaging gear wheels. As an alternative, at least one of the first and second mechanical coupling arrangements may be configured to provide a variable gear ratio, such as by providing a gear box with different gear ratios, thereby providing more control options to the power system which may provide further improved efficiency.

Optionally, the mechanical couplings of the first hydraulic machine to the main shaft and the first electric machine to the main shaft may have different gear ratios with respect to the main shaft. Still optionally, the mechanical couplings of the second hydraulic machine to the rotatable second member and the second electric machine to the rotatable second member may have different gear ratios with respect to the rotatable second member. Still optionally, the mechanical couplings of the first hydraulic machine and the first electric machine may have the same gear ratio. Still optionally, the mechanical couplings of the second hydraulic machine and the second electric machine may have the same gear ratio.

According to the second aspect, the object is achieved by a method for operating a power system for a working machine, wherein the power system comprises:
  a prime mover and a main shaft, wherein the prime mover is drivingly connectable to the main shaft;
  a planetary gear set comprising a rotatable first member drivingly connected to the main shaft, a rotatable second member and a rotatable third member for propulsion of the working machine;
  a hydraulic system comprising at least one hydraulic actuator for performing a working function of the working machine during use of the working machine;
  an electric energy storage system;
  a first hydraulic machine mechanically coupled to the main shaft and hydraulically coupled to the hydraulic system;
  a first electric machine mechanically coupled to the main shaft;
  a second electric machine mechanically coupled to the rotatable second member, wherein the first and second electric machines are electrically connected, and wherein the electric energy storage system is electrically connected to the first and second electric machines, and wherein the power system further comprises a second hydraulic machine mechanically coupled to the rotatable second member and hydraulically coupled to the hydraulic system;
  wherein the method comprises operating the second hydraulic machine as a pump or as a motor.

Advantages and effects of the second aspect of the invention are largely analogous to the advantages and effects of the first aspect of the invention. More specifically, by use of the configuration of the power system as disclosed herein, it has been realized that the power system can be more efficiently operated. In fact, operating the second hydraulic machine as a pump or as a motor in the power system disclosed herein opens up for fewer and more efficient power transformations in the power system. It shall also be noted that all embodiments of the first aspect of the invention are applicable to all embodiments of the second aspect of the invention and vice versa.

Optionally, the method may further comprise:
driving the second hydraulic machine as a pump by use of mechanical power provided to the rotatable second member from the main shaft, and
when there is residual mechanical power provided to the rotatable second member from the main shaft:
operating the second electric machine as a generator by use of the residual mechanical power.

Thereby, the residual mechanical power may be efficiently obtained by the second electric machine, in which the generated electric power may be efficiently used for other purposes in the power system, directly or later on. This may further imply lower required torque for the second electric machine and/or lower amount of recirculating energy in the power system.

Optionally, the method may further comprise charging the electric energy storage system by use of electric energy generated by the second electric machine. Thereby the residual mechanical power may be efficiently converted to electric power which is stored in the electric energy storage system for later use, implying increased machine efficiency over time.

Optionally, the method may further comprise operating the first electric machine as a motor by use of electric energy generated by the second electric machine. Thereby, mechanical power obtained by the second electric machine, such as the obtained residual mechanical power mentioned in the above, may be efficiently converted to electric power and transferred to the first electric machine without any further power transformations.

Optionally, as mentioned in the above, the first and second hydraulic machines may be hydraulically coupled so that hydraulic power can be transferred in at least one direction, preferably in any direction, between the first and second hydraulic machine, wherein the method may further comprise:
transferring hydraulic power from one of the first and second hydraulic machines to the other one of the first and second hydraulic machines.

Hence, as mentioned in the above, this may open up for downsizing of the electric machines, implying a more cost-efficient power system. Further, as mentioned in the above, it may be more efficient to selectively transfer power hydraulically or electrically depending on required torque and speed.

Optionally, the method may further comprise:
driving the first hydraulic machine as a pump by use of mechanical power from the main shaft; and at the same time:
operating the second electric machine as a motor by use of electric energy stored in the electric energy storage system. This may imply further improved efficiency, reduced amount of power transformations and reduced power losses.

Optionally, the method may further comprise:
driving the second hydraulic machine as a pump by the second electric machine.

This may be particularly favorable in cases when the rotatable second member of the planetary gear set is freewheeling. The second electric machine may then drive the second hydraulic machine as a pump with an optimized rotational speed independent of other rotational speeds in the power system. The hydraulic power from the second hydraulic machine may then e.g. be transferred to the at least one hydraulic actuator of the hydraulic system.

According to the third aspect, the object is achieved by a control unit for a working machine, wherein the control unit is configured to perform the steps of any one of the embodiments of the second aspect of the invention.

According to the fourth aspect, the object is achieved by a working machine comprising the power system according to any one of the embodiments of the first aspect of the invention.

Optionally, the working machine may comprise the control unit according to any one of the embodiments of the third aspect of the invention.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings.

DETAILED DESCRIPTION OF EXAMPLE EMBODIMENTS OF THE INVENTION

Figure 1:
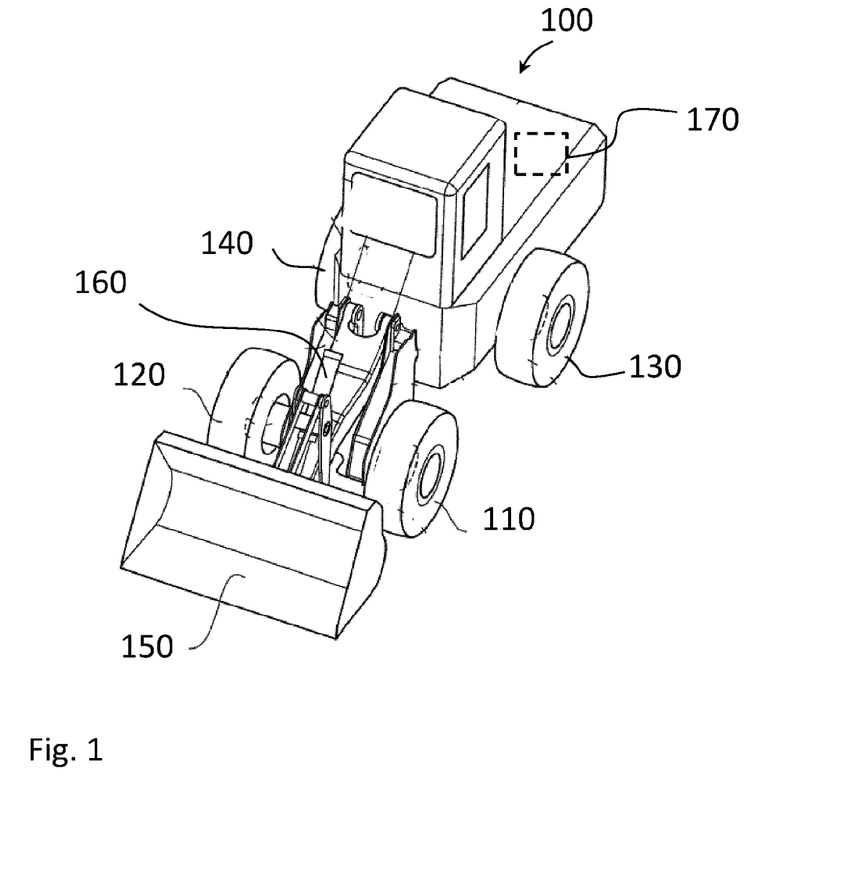
FIG. 1 shows a schematic perspective view of a working machine according to an example embodiment of the present invention.

In FIG. 1, a working machine 100 in the form of a wheel loader is shown in a schematic perspective view. The wheel loader 100 comprises a power system 1 (not shown) according to any one of the embodiments of the first aspect of the invention. The wheel loader 100 may as shown also comprise a control unit 170 which is configured to perform any one of the steps of the method according to the second aspect of the present invention.

The control unit 170 may include a microprocessor, microcontroller, programmable digital signal processor or another programmable device. The control unit may also, or instead, include an application specific integrated circuit, a programmable gate array or programmable array logic, a programmable logic device, or a digital signal processor. Where the control unit 170 includes a programmable device such as the microprocessor, microcontroller or programmable digital signal processor mentioned above, the processor may further include computer executable code that controls operation of the programmable device. The control unit 170 may comprise embedded hardware, sometimes with integrated software, where the hardware show close physical relationship. Examples of physical relationships are: shared casing and components mounted on one or several circuit boards. It shall also be noted that the control unit 170 may be a combination of several communicatively connected control units.

The wheel loader 100 as shown in FIG. 1 comprises four wheels 110, 120, 130 and 140. It further comprises a front bucket 150. The front bucket 150 can be actuated by use of at least one hydraulic actuator 160 which is operated and powered by a hydraulic system 5 (see e.g. FIG. 2).

Even though a wheel loader 100 is shown in FIG. 1, it shall be noted that the present invention as disclosed herein may be used for any other type of working machine and/or vehicle which also comprises a hydraulic system with at least one hydraulic actuator for performing a working function. Furthermore, the working machine 100 may instead of wheels for example comprise crawler members for moving the working machine 100. Hence, the working machine 100 may comprise any type of ground engaging means, or any combination of different types of ground engaging means.

Figure 2:
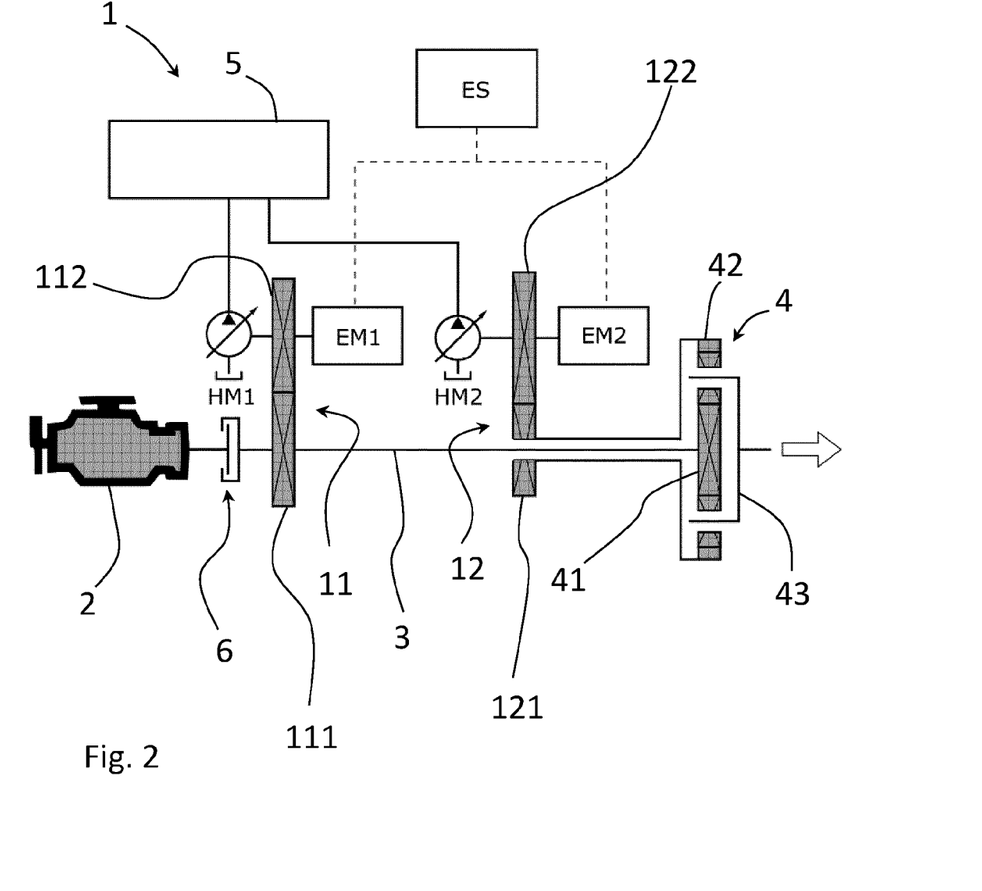
FIG. 2 shows a schematic view of a power system according to an example embodiment of the present invention.

With respect to FIG. 2, a schematic view of a power system 1 according to an example embodiment of the present invention is shown. The power system 1 comprises a prime mover 2 and a main shaft 3, wherein the prime mover 2 is drivingly connectable to the main shaft 3. In the shown embodiment the prime mover 2 is an internal combustion engine, such as a diesel engine. However, it shall be noted that any type of prime mover may advantageously be used, such as a main electric motor. Hence, according to an example embodiment of the present invention, the working machine 100 may be a fully electric working machine.

The power system 1 further comprises a planetary gear set 4 comprising a rotatable first member 41 drivingly connected to the main shaft 3, a rotatable second member 42 and a rotatable third member 43 for propulsion of the working machine 100. In the shown embodiment, the rotatable first member 41 is a sun gear of the planetary gear set 4, the rotatable second member 42 is a ring gear of the planetary gear set 4 and the rotatable third member 43 is a planet carrier of the planetary gear set 4. It shall however be understood that also other configurations are possible, even though this configuration has shown to provide beneficial torque transfers and speed conversions. The rotatable third member 43 is further connectable to an output shaft (not shown) for propulsion of the working machine 100.

The power system 1 further comprises:
a hydraulic system 5 comprising at least one hydraulic actuator 160 (see FIG. 1) for performing a working function of the working machine 100 during use of the working machine 100;
an electric energy storage system ES;
a first hydraulic machine HM1 mechanically coupled to the main shaft 3 and hydraulically coupled to the hydraulic system 5;
a first electric machine EM1 mechanically coupled to the main shaft 3; and
a second electric machine EM2 mechanically coupled to the rotatable second member 42.

The electric energy storage system ES may be any kind of electric energy storage system, such as a battery or a plurality of battery packs, which for example may comprise lithium-ion battery cells. Alternatively, or complementary, the energy storage system ES may comprise a capacitor.

The first and second electric machines EM1, EM2 are electrically connected and the electric energy storage system ES is electrically connected to the first and second electric machines EM1, EM2. The electric machines EM1, EM2 and the electric energy storage system ES may for example be electrically connected via a junction box (not shown) or the like. By use of the electrical connections, electric power may be transferred directly between the electric machines EM1, EM2, implying improved efficiency, and also via the electric energy storage system ES. Thereby, electric energy generated by any one of the electric machines EM1, EM2 may also be stored for later use, implying improved efficiency over time. Further, any one of the electric machines EM1, EM2 may also be driven as a motor by electric power stored in the electric energy storage system ES.

The power system 1 further comprises a second hydraulic machine HM2 mechanically coupled to the rotatable second member 42 and hydraulically coupled to the hydraulic system 5.

In view of the above, a high efficient and low-cost power system 1 for a working machine 100 is achieved. For example, by configuring the power system 1 as shown in FIG. 2 where the first hydraulic machine HM1 and the first electric machine EM1 are mechanically coupled to the main shaft 3, and the second hydraulic machine HM2 and the second electric machine EM2 are mechanically coupled to the rotatable second member 42, the power system 1 can provide beneficial performance with lower amount of installed power, such as electric power. It also enables for fewer and more efficient power transformations.

The power system 1 as shown in FIG. 2 further comprises a first and a second mechanical coupling arrangement 11, 12. The first hydraulic machine HM1 and the first electric machine EM1 are directly coupled to the first mechanical coupling arrangement 11 and the second hydraulic machine HM2 and the second electric machine EM2 are directly coupled to the second mechanical coupling arrangement 12. The first mechanical coupling arrangement 11 is directly coupled to the main shaft 3 and the second mechanical coupling arrangement 12 is directly coupled to the rotatable second member 42. The first mechanical coupling arrangement 11 and the second mechanical coupling arrangement 12 are separate from each other. Hence, according to an example embodiment of the present invention, the hydraulic machines HM1 and HM2 are mechanically separated from each other and the electric machines EM1, EM2 are also mechanically separated from each other, forming a respective pair of one hydraulic machine and one electric machine, i.e. HM1+EM1 and HM2+EM2. In the shown embodiment, the first and second coupling arrangements 11, 12 are configured with a fixed gear ratio, even though also a variable gear ratio may be possible, such as by providing a gear box with different gear ratios. As shown, a fixed gear ratio is provided from the first hydraulic machine HM1 and the first electric machine EM1 to the main shaft 3. In addition, a fixed gear ratio is provided from the second hydraulic machine HM2 and the second electric machine EM2 to the rotatable second member 42. In the shown embodiments, the first mechanical coupling arrangement 11 is in the form of two mechanically engaging gear wheels 111, 112 and the second mechanical coupling arrangement is also in the form of two mechanically engaging gear wheels 121, 122. Further, according to another embodiment, the first electric machine EM1 may be mechanically coupled to the main shaft 3 with a first gear ratio and the first hydraulic machine HM1 may be mechanically coupled to the main shaft 3 with a second gear ratio which is different from the first gear ratio. A similar configuration is also possible for the second hydraulic machine HM2 and the second electric machine EM2 with respect to the rotatable second member 42.

Further, the second hydraulic machine HM2 as shown in FIG. 2 may be configured such that it can be operated in two opposite rotational directions in order to generate hydraulic power to the hydraulic system 5 in any one of the rotational directions. Still further, the first hydraulic machine HM1 may also be configured such that it can be operated in two opposite rotational directions in order to generate hydraulic power to the hydraulic system 5 in any one of the rotational directions. At least one of the first and second hydraulic machines HM1, HM2 may also be an electrically controlled hydraulic machine. Just as a matter of example, the first hydraulic machine HM1 may be a conventional mechanical load-sensing pump and the second hydraulic machine HM2 may be electrically controlled. Thereby the second hydraulic machine HM2 may boost the hydraulic power during certain operating modes to minimize power losses.

Still further, the first and second hydraulic machines HM1, HM2 as shown in FIG. 2 may be hydraulically coupled so that hydraulic power can be transferred in at least one direction, preferably in any direction, between the first and second hydraulic machine HM1, HM2. In the shown embodiment, at least one of the hydraulic machines HM1, HM2 is configured to be operated in all possible combinations of positive and negative rotational speeds and positive and negative torque. With this functionality a hydraulic variator can be achieved. Hence, power may be transferred hydraulically in parallel to the possibility of transferring electric power between the electric machines EM1, EM2. Typically, peak efficiencies of hydraulic machines and electric machines are in different operating areas. It can consequently be more efficient to transfer power hydraulically or electrically depending on required torque and speed. The hydraulic power path can for instance be used during lower speeds and high torques when the electric machines EM1, EM2 have poor efficiency. By use of the above configuration it may be possible to downsize the electric machines EM1, EM2 even more.

Further, FIG. 2 shows a coupling member 6 between the engine 2 and the main shaft 3 for selectively engaging and disengaging the engine 2 to the main shaft 3. Thereby, the engine 2 may temporarily be disengaged, enabling full electric operation.

Figure 3:
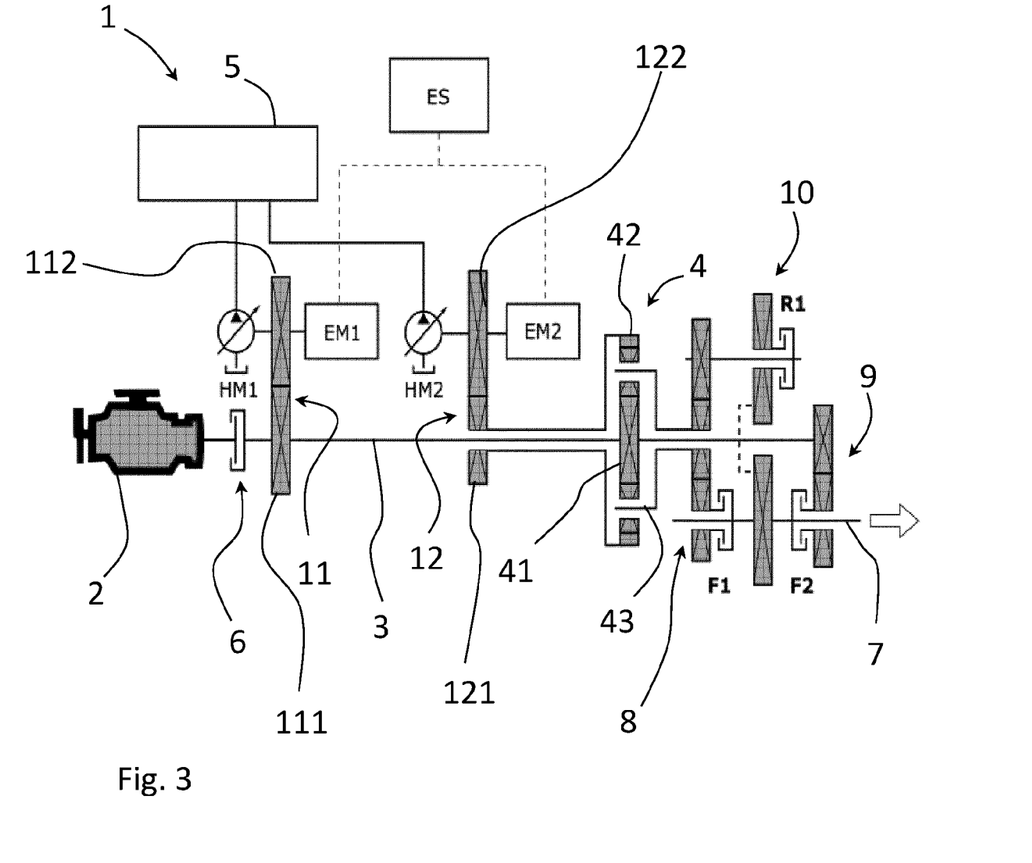
FIG. 3 shows a schematic view of a power system according to another example embodiment of the present invention.

The FIG. 3 embodiment shows a similar configuration as shown in FIG. 2, with the difference that the power system 1 also comprises a first gear set 8, a second gear set 9 and a reverse gear set 10. Further, an output shaft 7 is also shown.

More specifically, in addition to the FIG. 2 embodiment, the power system 1 further comprises the first gear set 8, wherein the rotatable third member 43 is drivingly connectable to an output shaft 7 for propulsion of the working machine 100 via the first gear set 8. The power system 1 further comprises a first gear set coupling member F1 for selectively engaging and disengaging the rotatable third member 43 with respect to the output shaft 7. It shall be understood that the output shaft 7 may form part of the power system 1 as disclosed herein.

Furthermore, the rotatable first member 41 is drivingly connectable to the output shaft 7 via the second gear set 9. The power system 1 further comprises a second gear set coupling member F2 for selectively engaging and disengaging the rotatable first member 41 with respect to the output shaft (7).

In addition, the rotatable third member 43 is drivingly connectable to the output shaft 7 via the reverse gear set 10 for selectively providing a reverse direction of the outgoing speed on the output shaft 7. For this a reverse gear set coupling member R1 is used for selectively engaging and disengaging the rotatable third member 43 to the output shaft 7.

The mode of operation when the first gear set coupling member F1 alone is engaged (and coupling members F2 and R1 are disengaged) is referred to as mode F1. The mode of operation when the second gear set coupling member F2 alone is engaged is referred to as mode F2. The mode of operation when the reverse gear set coupling member R1 alone is engaged is referred to as mode R1.

By the above configuration, it is also possible to engage both the first gear set coupling member F1 and the second gear set coupling member F2, thereby providing an additional mode F1F2 of the power system 1. For electric operation, F1F2 may provide an additional torque/speed range for the power system 1 (i.e. when the coupling member 6 is disengaged).

In mode F2, only the electric machine EM1 may be used for propulsion of the working machine 100. This may give a lower maximum output power. On the other hand the second hydraulic machine EM2 may drive the second hydraulic machine HM2. In modes F1 and F1F2, both electric machines EM1, EM2 can be used for propulsion of the working machine 100. However, the torque/speed range is shifted since the planetary gear set 4 is locked in the additional mechanical mode F1F2. This can be used when dimensioning the power system 1 for optimal operation between F1, F1F2 and F2. All three modes can also be used in reverse when driving purely electrical, since the electric machines EM1, EM2 may according to an example embodiment be controlled to negative speeds. This requires that the first hydraulic machine HM1 can be rotated in two directions.

In the embodiment shown in FIG. 3, the hydraulic machines HM1, HM2 may also advantageously be electrically controlled. This may provide higher output power for mode F2 (if the power required to the hydraulic work functions is not too high). Then both of the first electric machine EM1 and the first hydraulic machine HM1 may be used for providing torque to the main shaft 3.

The power systems 1 as shown in for example FIGS. 2 and 3 may be operated according to an example embodiment of the method as disclosed herein. The method may comprise a step of operating the second hydraulic machine HM2 as a pump or as a motor. Still further, the method may also comprise driving the second hydraulic machine HM2 as a pump by use of mechanical power provided to the rotatable second member 42 from the main shaft 3, and when there is residual mechanical power provided to the rotatable second member 42 from the main shaft 3, the second electric machine EM2 may be operated as a generator by use of the residual mechanical power.

The power system 1 as disclosed herein may typically operate in three modes of power flows—negative circulating power, additive power and full mechanical power. With the power system 1 as disclosed herein, negative circulating power may occur at lower speeds, e.g. 0-10 km/h (depending on the choice of gear ratios), full mechanical power at a higher speed, e.g. 10 km/h, and additive power at a yet higher speed, e.g. 10-20 km/h of the working machine 100.

In the negative circulating mode, the second electric machine EM2 may operate as a generator. When hydraulic power is needed for the hydraulic work functions, the second hydraulic machine HM2 may primarily be used. This may lower the required torque for the second electric machine EM2 and also the amount of recirculating energy. This is expected to occur during e.g. a front bucket 150 fill operation of the working machine 100 where the work hydraulics are used and the working machine 100 is operating at low speeds.

For the additive power mode, the present invention enables for a freedom to choose whether the first hydraulic machine HM1 or the second hydraulic machine HM2 should supply hydraulic power to optimize the efficiency. For instance, when the electric energy storage system ES is discharging, part of the power may be supplied by the second hydraulic machine HM2 in order to operate in the best efficiency point for the engine 2 and for the first hydraulic machine HM1.

In the proximity of the full mechanical point, the speed of the second rotatable member 42 is close to zero. The second hydraulic machine HM2 may then assist the second electric machine EM2 in supplying a torque to the second rotatable member 42 if the second hydraulic machine HM2 is electrically controlled. This could reduce the total amount of losses (the hydraulic machines HM1, HM2 typically have higher efficiencies in low speeds and high torques than the electric machines EM1, EM2).

The method may further comprise charging the electric energy storage system ES by use of electric energy generated by the second electric machine EM2.

The method may further comprise operating the first electric machine EM1 as a motor by use of electric energy generated by the second electric machine EM2.

The method may further comprise transferring hydraulic power from one of the first and second hydraulic machines HM1, HM2 to the other one of the first and second hydraulic machines HM1, HM2.

The method may further comprise driving the first hydraulic machine HM1 as a pump by use of mechanical power from the main shaft 3, and at the same time operating the second electric machine EM2 as a motor by use of electric energy stored in the electric energy storage system ES.

The method may further comprise driving the second hydraulic machine HM2 as a pump by the second electric machine EM2.

It is to be understood that the present invention is not limited to the embodiments described above and illustrated in the drawings; rather, the skilled person will recognize that many changes and modifications may be made within the scope of the appended claims.

The invention claimed is:

1. A power system for a working machine, comprising:
a prime mover and a main shaft, wherein the prime mover is drivingly connectable to the main shaft;
a planetary gear set comprising a rotatable first member drivingly connected to the main shaft, a rotatable second member and a rotatable third member for propulsion of the working machine;
a hydraulic system comprising at least one hydraulic actuator for performing a working function of the working machine during use of the working machine;
an electric energy storage system;
a first hydraulic machine mechanically coupled to the main shaft and hydraulically coupled to the hydraulic system;
a first electric machine mechanically coupled to the main shaft;
a second electric machine mechanically coupled to the rotatable second member, wherein the first and second electric machines are electrically connected and wherein the electric energy storage system is electrically connected to the first and second electric machines, and wherein the power system further comprises:
a second hydraulic machine mechanically coupled to the rotatable second member and hydraulically coupled to the hydraulic system, wherein the second hydraulic machine is configured such that it can be operated in two opposite rotational directions in order to generate hydraulic power to the hydraulic system.

2. The power system according to claim 1, wherein at least one of the first and second hydraulic machines is an electrically controlled hydraulic machine.

3. The power system according to claim 1, wherein the first and second hydraulic machines are hydraulically coupled so that hydraulic power can be transferred in at least one direction, preferably in any direction, between the first and second hydraulic machine.

4. The power system according to claim 1, wherein at least one of the hydraulic machines is configured to be operated in all possible combinations of positive and negative rotational speeds and positive and negative torque.

5. The power system according to claim 1, wherein the rotatable first member is a sun gear of the planetary gear set.

6. The power system according to claim 1, wherein the rotatable second member is a ring gear of the planetary gear set.

7. The power system according to claim 1, wherein the rotatable third member is a planet carrier of the planetary gear set.

8. The power system according to claim 1, further comprising a coupling member between the prime mover and the main shaft for selectively engaging and disengaging the prime mover to the main shaft.

9. The power system according to claim 1, further comprising a first gear set, wherein the rotatable third member is drivingly connectable to an output shaft for propulsion of the working machine via the first gear set.

10. The power system according to claim 9, further comprising a first gear set coupling member for selectively engaging and disengaging the rotatable third member with respect to the output shaft.

11. The power system according to claim 9, further comprising a second gear set, wherein the rotatable first member is drivingly connectable to the output shaft via the second gear set.

12. The power system according to claim 11, further comprising a second gear set coupling member for selectively engaging and disengaging the rotatable first member with respect to the output shaft.

13. The power system according to claim 9, further comprising a reverse gear set, wherein the rotatable third member is drivingly connectable to the output shaft via the reverse gear set for selectively providing a reverse direction of the outgoing speed on the output shaft.

14. The power system according to claim 1, further comprising a first and a second mechanical coupling arrangement, wherein the first hydraulic machine and the first electric machine are directly coupled to the first mechanical coupling arrangement and the second hydraulic machine and the second electric machine are directly coupled to the second mechanical coupling arrangement, and wherein the first mechanical coupling arrangement is directly coupled to the main shaft and the second mechanical coupling arrangement is directly coupled to the rotatable second member.

15. A working machine comprising the power system according to claim 1.

16. The working machine according to claim 15, comprising a control unit configured to operate the second hydraulic machine as a pump or as a motor.

17. A method for operating a power system for a working machine, wherein the power system comprises:
a prime mover and a main shaft, wherein the prime mover is drivingly connectable to the main shaft;
a planetary gear set comprising a rotatable first member drivingly connected to the main shaft, a rotatable second member and a rotatable third member for propulsion of the working machine;
a hydraulic system comprising at least one hydraulic actuator for performing a working function of the working machine during use of the working machine;
an electric energy storage system;
a first hydraulic machine mechanically coupled to the main shaft and hydraulically coupled to the hydraulic system;
a first electric machine mechanically coupled to the main shaft;
a second electric machine mechanically coupled to the rotatable second member, wherein the first and second electric machines are electrically
connected, and wherein the electric energy storage system is electrically connected to the first and second electric machines, and wherein the power system further comprises a second hydraulic machine mechanically coupled to the rotatable second member and hydraulically coupled to the hydraulic system, wherein the second hydraulic machine is configured such that it can be operated in two opposite rotational directions in order to generate hydraulic power to the hydraulic system;
wherein the method comprises operating the second hydraulic machine as a pump or as a motor.

18. The method according to claim 17, further comprising:
driving the second hydraulic machine as a pump by use of mechanical power provided to the rotatable second member from the main shaft, and
when there is residual mechanical power provided to the rotatable second member from the main shaft:
operating the second electric machine as a generator by use of the residual mechanical power.

19. The method according to claim 17, further comprising charging the electric energy storage system by use of electric energy generated by the second electric machine.

20. The method according to claim 17, further comprising operating the first electric machine as a motor by use of electric energy generated by the second electric machine.

21. The method according to claim 17, wherein the first and second hydraulic machines are hydraulically coupled so that hydraulic power can be transferred in at least one direction, preferably in any direction, between the first and second hydraulic machine, the method further comprising:
transferring hydraulic power from one of the first and second hydraulic machines to the other one of the first and second hydraulic machines.

22. The method according to claim 17, further comprising:
driving the first hydraulic machine as a pump by use of mechanical power from the main shaft; and at the same time:
operating the second electric machine as a motor by use of electric energy stored in the electric energy storage system.

23. The method according to claim 17, further comprising:
driving the second hydraulic machine as a pump by the second electric machine.

24. A control unit for a working machine, the control unit being configured to perform the steps of claim 17.

* * * * *